Nov. 7, 1933.      R. F. BACON      1,934,474
RECOVERY OF SULPHUR FROM ROASTER GASES
Filed May 6, 1927
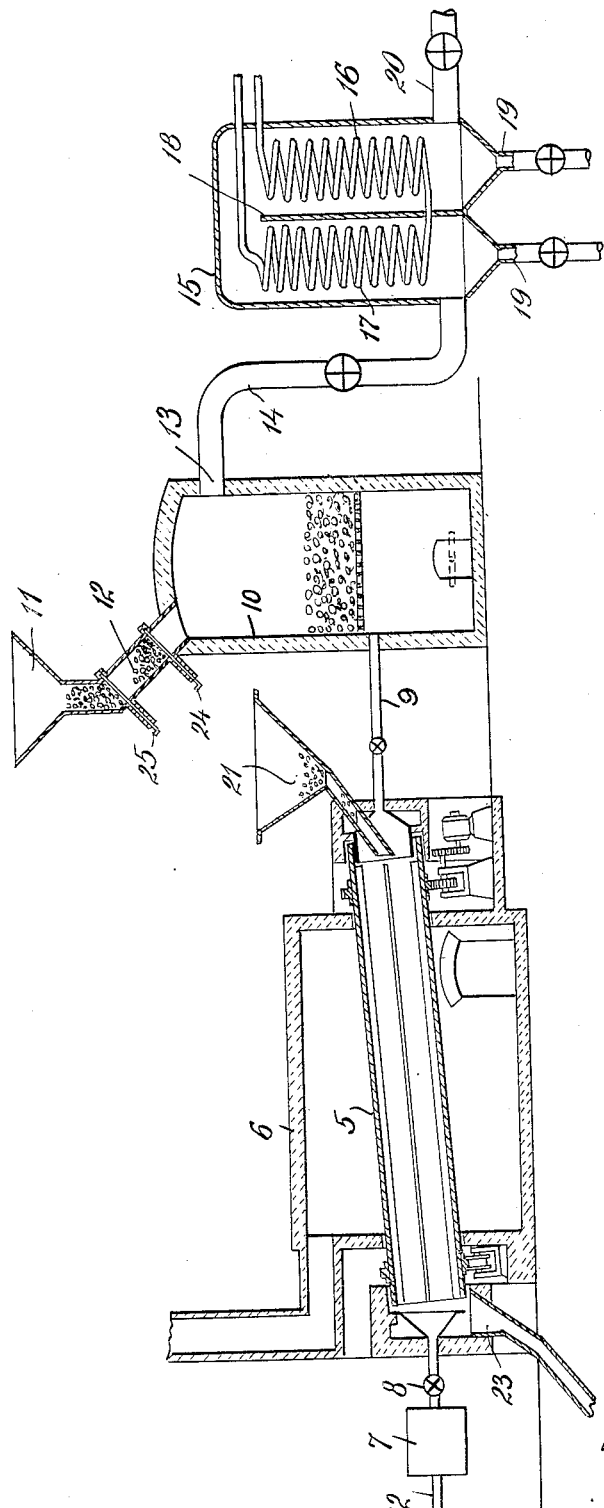
INVENTOR
Raymond F Bacon
BY
Pennie, Davis, Marvin and Edmonds
HIS ATTORNEYS Patented Nov. 7, 1933

1,934,474

UNITED STATES PATENT OFFICE 1,934,474

RECOVERY OF SULPHUR FROM ROASTER GASES

Raymond F. Bacon, Bronxville, N. Y.

Application May 6, 1927. Serial No. 189,274

2 Claims. (Cl. 23—226)

This invention relates to the treatment of sulphur-bearing material, such as mineral sulphide ores, and has for its object the provision of an improved method of treating sulphur-bearing material. More particularly, the invention aims to provide an improved method of recovering elemental sulphur from roaster gases by roasting under pressure and recovering sulphur from the roaster gases under pressure.

Sulphur dioxide may be reduced to elemental sulphur by suitable high temperature treatment with reducing agents, such as carbonaceous fuels in the nature of coke, liquids in the nature of petroleum, or gases in the nature of natural gas, producer gas or water gas. When it is desired to carry out this reaction, making use of roaster gases as the source of sulphur dioxide, the dilute nature of the roaster gases and the consequent low content of sulphur dioxide tend to make the commercial practice impracticable.

I have discovered that the roaster gases may be enriched in sulphur dioxide when the roasting operation is carried out under a pressure of from four to five atmospheres. This is particularly true when the roasting operation is carried out in such a manner that the oxidizing gas, such as air, is brought into intimate contact with the sulphur-bearing material in the roasting furnace. In order to bring about an intimate contact between the gas and the sulphur-bearing material, I have found it advantageous to use a rotary retort with fins or blades running longitudinally in the retort. These blades as the retort revolves pick up portions of the sulphur-bearing material and permit it to shower down through the compressed gas to the lower portion of the retort. I have found that under these conditions, with an appropriate external heat supplied to the retort, that substantially all of the oxygen of the reacting air reacts with the sulphur of the sulphur-bearing compound, so that the gases withdrawn from the roasting retort contain a very much higher content of sulphur dioxide than is normally present in such gases, and I have found that it is possible to approach very closely to the theoretical quantity of sulphur dioxide so that the exiting gases contain nothing but sulphur dioxide and inert gases.

I have further discovered that if these gases, still under pressure, are passed directly to the reducing furnace or chamber, where they are brought into contact with suitable heated reducing agents and the reduced gases then subjected to condensation under pressure, that substantially all of the sulphur may be recovered as elemental sulphur.

In the practice of the invention, I have found it advantageous to place the oxidizing retort as closely as possible to the reducing chamber so that there will be substantially no loss of heat as the gases pass from the oxidizing retort to the reducing chamber. When this condition is carried out and the reducing material and chamber are first brought to the requisite temperature, I have found that the heat of the reduction process will be sufficient to continuously reduce the sulphur dioxide to elemental sulphur without the addition of external heat.

In practicing the invention, it has further been found advantageous to carry out the condensation of the sulphur vapors also under the same pressure that the two earlier steps of the process were operated under. When this condition is carried out under pressure, it has been found that the sulphur condenses more readily, and cleaner and better separation and recovery of sulphur can be made.

Various forms of apparatus are available for the practice of the invention. In the single figure of the drawing, I have illustrated an apparatus satisfactory for the purpose.

The apparatus illustrated in the drawing comprises a rotating, inclined, cylindrical retort 5 of any appropriate material, adapted to withstand corrosive influences encountered in roasting sulphur-bearing compounds to obtain sulphur dioxide. The retort is enclosed for the greater part of its length in an appropriate furnace structure 6.

The lower or discharging end of the retort is operatively connected to a pressure pump 7 by the valved pipe 8. The pressure pump 7 receives atmospheric air through the intake 22. The upper or charging end of the retort is operatively connected to the reduction furnace or chamber 10 by the valved pipe 9.

The reduction chamber is supplied with reducing material in any appropriate manner. Coal or coke may be admitted for this purpose from the hopper 11, through the valved pipe 12. The reduced gases are withdrawn from the reducing chamber 10, through an opening 13 which is operatively connected to the pressure condenser 15 by the valved pipe 14.

The pressure condenser 15 is adapted to chill the entering vapors by means of the cooling coils 16 and 17 and is preferably divided into two portions by the baffle wall 18. Suitable valved sulphur withdrawing passages 19 are provided in the condenser compartment bottoms and a valved gas exit passage 20 releases the spent gases from the processes.

The operation of the apparatus will be understood from the foregoing description. Sulphur-bearing material in the nature of pyrites is fed into the retort 5 through the hopper 21. Air to support combustion is admitted through the opening 22 and the spent cinder or ash is withdrawn from the lower end of the retort 5 through the hopper 23. During the operation of the retort external heat is provided for the retort by means of the furnace 6.

The pressure pump 7 forces the compressed air under a pressure of from four to five atmospheres into the retort 5, where the oxygen of the air reacts with the heated sulphur-bearing compounds to form sulphur dioxide. The sulphur dioxide is forced from the retort 5 through the valved pipe 9 into the reducing furnace or chamber 10. The retort 10 with its reducing material has, prior to the advent of the sulphur dioxide, been heated to a sufficiently high temperature so that the sulphur dioxide reacts with the reducing agent and the sulphur dioxide is reduced to elemental sulphur and inert gases. While the supply of roaster gases is continuous to the reduction furnace 10 under a pressure of from four to five atmospheres, the heat of reaction is sufficient to continuously carry on the reduction operation. While the process is working continuously in this manner, it has been found that it is not necessary to furnish external heat to maintain the reaction.

Suitable carbonaceous fuel is admitted to the reducing chamber from the supply hopper 11 through the valved pipe 12. The two valves 24 and 25 in the pipe 12 are alternately opened so that there is a minimum loss of pressure in the reduction chamber during the charging process. A suitable reservoir adapted for the release of spent cinder or ash is provided in the lower portion of the reducing chamber, and appropriate means (not shown) adapted for periodically withdrawing the ash.

The vapors in the upper part of the reducing chamber are released through the passage 13 and carried through the valved passageway 14 to the condenser 15 where they are appropriately cooled by contact with the cooling coils 16 and 17. The vapors in their passage through the condenser 15 pass upward and over the baffle wall 18, and thus are brought successively in contact with the cooling coils 17 and 16, and in that manner gradually cooled, since the cooling liquid passes successively from the coil 16 to the coil 17.

The condensed sulphur falls to the bottom of the condenser where it is intermittently withdrawn through the valved passages 19. The spent gases are permitted to escape through the valved passage 20. The regulation of the valve in the passage 20 determines largely the pressure which is maintained in the condenser, the reduction chamber and the retort.

While certain forms of apparatus have been illustrated, it is understood that these may be changed or varied at will without in any way departing from the spirit of the invention. The use of a liquid hydrocarbon or a gaseous reducing agent in place of the solid carbonaceous fuel will necessitate a different type of reduction chamber. The type of condenser may be changed to suit any operating condition which may be met. The oxidizing retort might be altered to better handle any given type of sulphur-bearing material.

I claim:

1. The method of recovering elemental sulphur from sulphur-bearing material such as mineral sulphide ores which comprises roasting the sulphur-bearing material in the presence of regulated amounts of air and under pressure, said air being supplied in amount sufficient to provide oxygen for the conversion of substantially all of the sulphur available in the material to sulphur dioxide while not diluting the resulting gases with appreciable amounts of uncombined oxygen, and subjecting the sulphur dioxide gases so formed without any substantial loss in heat to a reduction operation conducted under pressure substantially above atmospheric in the presence of incandescent carbon.

2. The method of recovering elemental sulphur from sulphur-bearing material such as mineral sulphide ores which comprises roasting the sulphur-bearing material in the presence of regulated amounts of air and under pressure, said air being supplied in amount sufficient to provide oxygen for the conversion of substantially all of the sulphur available in the material to sulphur dioxide while not diluting the resulting gases with appreciable amounts of uncombined oxygen, subjecting the sulphur dioxide gases so formed without any substantial loss in heat to a reduction operation conducted under pressure substantially above atmospheric in the presence of incandescent carbon, and subjecting the sulphur vapor liberated in the reduction step to condensation under pressure.

RAYMOND F. BACON.